US009303548B2

(12) United States Patent
Fletcher et al.

(10) Patent No.: US 9,303,548 B2
(45) Date of Patent: Apr. 5, 2016

(54) DIESEL ENGINE FLUID COOLANT SYSTEM HAVING A SOLENOID-POWERED GATE VALVE

(71) Applicants: Dave Fletcher, Flint, MI (US); Brian M. Graichen, Leonard, MI (US); Matt Gilmer, Whitmore Lake, MI (US); James H. Miller, Ortonville, MI (US); Jeff Rogala, Delafield, WI (US)

(72) Inventors: Dave Fletcher, Flint, MI (US); Brian M. Graichen, Leonard, MI (US); Matt Gilmer, Whitmore Lake, MI (US); James H. Miller, Ortonville, MI (US); Jeff Rogala, Delafield, WI (US)

(73) Assignees: Dayco IP Holdings, LLC, Troy, MI (US); TLX Technologies, LLC, Pewaukee, WI (US)

( * ) Notice: Subject to any disclaimer, the term of this patent is extended or adjusted under 35 U.S.C. 154(b) by 0 days.

(21) Appl. No.: 14/539,656

(22) Filed: Nov. 12, 2014

(65) Prior Publication Data

US 2015/0128573 A1    May 14, 2015

Related U.S. Application Data

(60) Provisional application No. 61/902,896, filed on Nov. 12, 2013.

(51) Int. Cl.
*F16K 3/16* (2006.01)
*F16K 3/02* (2006.01)
(Continued)

(52) U.S. Cl.
CPC .................. *F01P 7/14* (2013.01); *F01N 3/2066* (2013.01); *F16K 3/029* (2013.01); *F16K 3/16* (2013.01);
(Continued)

(58) Field of Classification Search
CPC ..... F01N 3/2006; F01N 3/2066; F01N 11/00; F01N 2550/05; F01N 2610/02; F01N 2610/105; F01N 2610/1486; F01N 2900/1811; F01P 7/14; F01P 2007/146; F01P 2060/10; F16K 3/0209; F16K 3/029; F16K 3/16; F16K 39/04
See application file for complete search history.

(56) References Cited

U.S. PATENT DOCUMENTS 2,740,962 A    6/1956   Kreichman et al.
2,816,730 A    12/1957  Rabas
(Continued)

FOREIGN PATENT DOCUMENTS

CA    1063454    10/1975
CN    2085459    9/1991
(Continued)

OTHER PUBLICATIONS

PCT, International Search Report and Written Opinion, International Application No. US/2014/069461 (Mar. 4, 2015).
(Continued)

*Primary Examiner* — Audrey K Bradley
(74) *Attorney, Agent, or Firm* — Thompson Hine LLP

(57) ABSTRACT

A diesel engine fluid reservoir system having a reservoir of diesel exhaust fluid in thermal communication with a heating element, a first conduit for the flow of engine coolant fluid to the heating element, a temperature sensor disposed to sense ambient temperature and/or a temperature of the diesel exhaust fluid, a controller communicatively coupled to the temperature sensor and communicatively coupled to a sprung gate valve included in the first conduit. The gate valve has a no-flow position and a flow position for control of the flow of engine coolant and includes an endless elastic band sandwiched between a first gate member and a second gate member each defining an opening therethrough alignable with the first conduit in the flow position. In response to a sensed temperature at which the diesel exhaust fluid is frozen, the controller signals the gate valve to be in the flow position.

16 Claims, 12 Drawing Sheets

(51) Int. Cl.
  *F01N 3/00*  (2006.01)
  *F01P 7/14*  (2006.01)
  *F01N 3/20*  (2006.01)

(52) U.S. Cl.
  CPC ....... *F01N 2610/02* (2013.01); *F01N 2610/105* (2013.01); *F01N 2900/1811* (2013.01); *F01P 2007/146* (2013.01); *F01P 2060/10* (2013.01)

(56) References Cited

U.S. PATENT DOCUMENTS

| | | |
|---|---|---|
| 2,913,220 A | 11/1959 | Cover |
| 2,953,346 A | 9/1960 | Liecke et al. |
| 3,069,131 A | 12/1962 | Grove |
| 3,113,757 A | 12/1963 | Nixon |
| 3,478,771 A * | 11/1969 | Johnson .................... F16K 3/02 137/242 |
| 3,635,601 A | 1/1972 | Larson et al. |
| 3,768,774 A | 10/1973 | Baugh |
| 3,871,616 A | 3/1975 | Taylor |
| 4,010,928 A | 3/1977 | Smith |
| 4,013,090 A | 3/1977 | Taylor |
| 4,056,255 A | 11/1977 | Lace |
| 4,210,308 A | 7/1980 | Sims |
| 4,341,369 A | 7/1982 | Meyer |
| 4,446,887 A | 5/1984 | Redmon et al. |
| 4,535,967 A | 8/1985 | Babbitt et al. |
| 4,568,058 A | 2/1986 | Shelton |
| 4,585,207 A | 4/1986 | Shelton |
| 4,638,193 A | 1/1987 | Jones |
| 4,934,652 A | 6/1990 | Golden |
| 5,000,215 A | 3/1991 | Phillips |
| 5,059,813 A | 10/1991 | Shiroyama |
| 5,195,722 A | 3/1993 | Bedner |
| 5,394,131 A | 2/1995 | Lungu |
| 5,627,504 A | 5/1997 | Kleinhappl |
| 5,909,525 A | 6/1999 | Miller et al. |
| 6,158,718 A | 12/2000 | Lang et al. |
| 6,199,587 B1 | 3/2001 | Shlomi et al. |
| 6,337,612 B1 | 1/2002 | Kim et al. |
| 6,425,410 B1 | 7/2002 | Taylor |
| 6,442,955 B1 | 9/2002 | Oakner et al. |
| 7,017,886 B1 | 3/2006 | Ngene-Igwe |
| 7,523,916 B2 | 4/2009 | Fenton |
| 7,849,674 B2 | 12/2010 | Masuda et al. |
| 8,561,392 B2 | 10/2013 | Ogunleye et al. |
| 2002/0066877 A1 | 6/2002 | Nakagawa |
| 2006/0016477 A1 | 1/2006 | Zaparackas |
| 2006/0219302 A1 | 10/2006 | Knop |
| 2008/0099710 A1 | 5/2008 | Jennings |
| 2009/0020719 A1 | 1/2009 | Ishigaki |
| 2009/0094009 A1 | 4/2009 | Muller |
| 2011/0132311 A1 | 6/2011 | Pursifull et al. |
| 2012/0256111 A1 | 10/2012 | Hoang et al. |
| 2012/0256113 A1 | 10/2012 | Comeaux |
| 2012/0286182 A1 | 11/2012 | Hoang |
| 2012/0313023 A1 | 12/2012 | Brock |
| 2013/0061949 A1 | 3/2013 | Minezawa et al. |
| 2013/0340732 A1 | 12/2013 | Pursifull et al. |

FOREIGN PATENT DOCUMENTS

| | | |
|---|---|---|
| CN | 2534389 | 2/2003 |
| CN | 201679974 | 12/2010 |
| CN | 101963240 | 2/2011 |
| CN | 201866285 | 6/2011 |
| DE | 3209199 | 9/1983 |
| DE | 19727602 | 10/1998 |
| EP | 1333207 | 6/2003 |
| GB | 1411303 | 10/1975 |
| JP | S59-214280 | 12/1984 |
| JP | S61-180423 | 8/1986 |
| JP | 3665674 | 6/2005 |
| WO | 95/29356 | 11/1995 |
| WO | 01/14775 | 3/2001 |
| WO | 2009/045140 | 4/2009 |
| WO | 2012/100287 | 8/2012 |
| WO | 2013/049643 | 4/2013 |

OTHER PUBLICATIONS

PCT, International Search Report and Written Opinion, International Application No. US/2014/069528 (Mar. 10, 2015).
PCT, International Search Report and Written Opinion, International Application No. US/2014/069796 (Mar. 12, 2015).
PCT, International Search Report and Written Opinion, International Application No. PCT/US2014/038018 (Nov. 26, 2014).
PCT, International Search Report and Written Opinion, International Application No. PCT/US2014/053435 (Dec. 18, 2014).
PCT, International Search Report and Written Opinion, International Application No. PCT/US2014/065252 (Feb. 19, 2015).

* cited by examiner

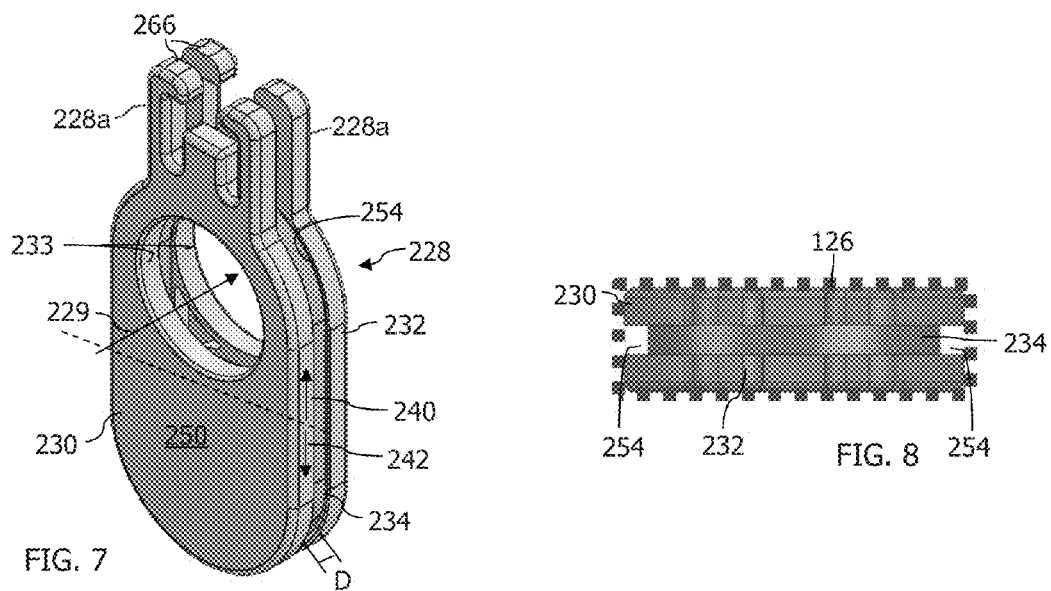
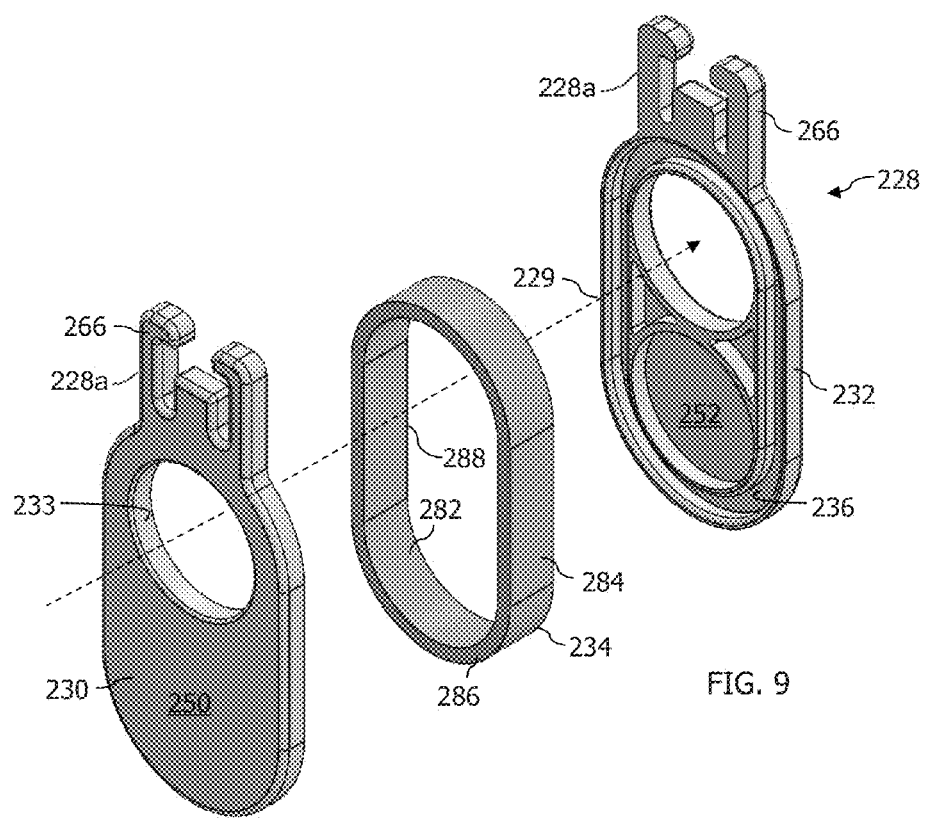

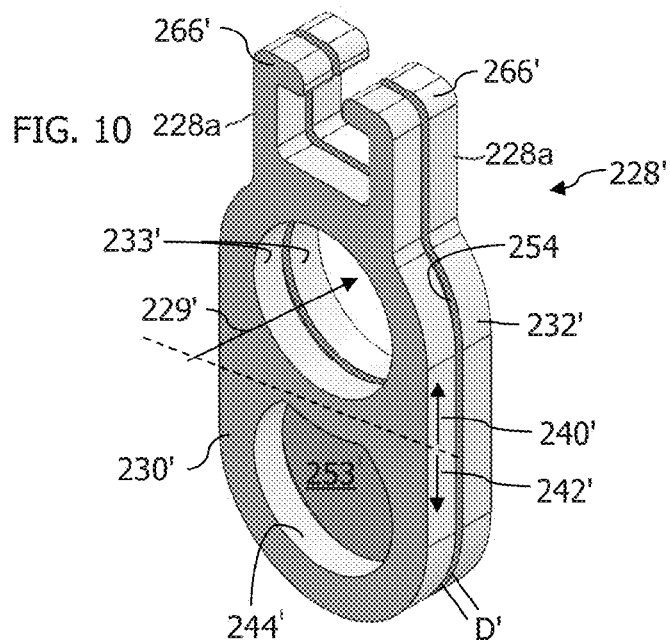
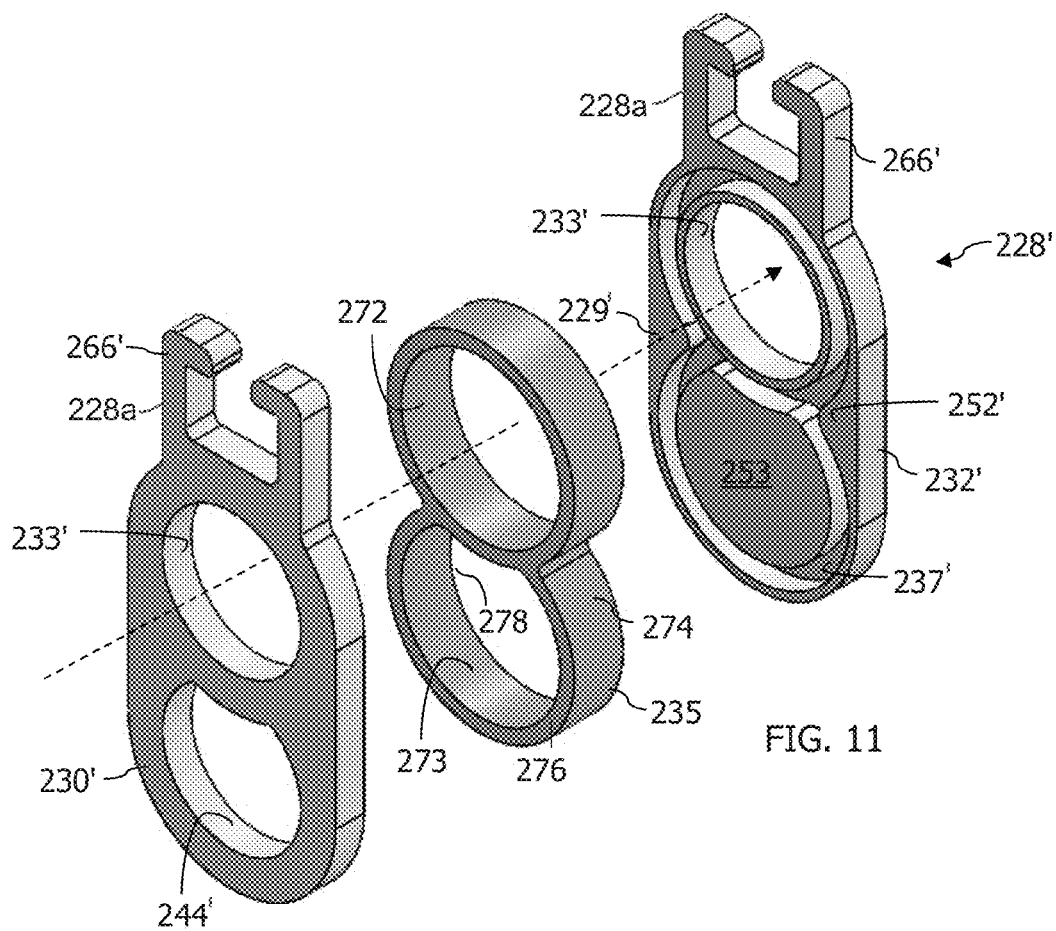

DIESEL ENGINE FLUID COOLANT SYSTEM HAVING A SOLENOID-POWERED GATE VALVE

RELATED APPLICATIONS

This application claims the benefit of U.S. Provisional Application No. 61/902,896, filed Nov. 12, 2013, the entirety of which is incorporated herein by reference.

TECHNICAL FIELD

This application relates to diesel engine fluid reservoir systems and, more particularly, to such systems having a solenoid-powered gate valve configured to selectively control the flow of engine coolant between a diesel engine fluid reservoir heating element and an engine.

BACKGROUND

In diesel engines, to meet regulatory standards for reduced emission leveled, engine and vehicle manufactures use selective catalytic reduction ("SCR") systems which inject a fluid, diesel exhaust fluid ("DEF"), into the exhaust. The DEF is typically stored in a reservoir and introduced into the exhaust on demand from an engine control unit. DEF is however subject to freezing if exposed to too cold of temperatures. As such, to prevent the DEF from freezing, engine coolant is diverted to a heating element in the reservoir to keep the DEF from freezing or to thaw the DEF if it is already frozen. A valve such as a poppet, diaphragm, or spool valve, typically electronically controlled, have been used as a control valve to control the flow of the coolant from the main coolant system to the heating element in the reservoir containing the DEF.

The electronically controlled poppet, diaphragm, and spool valves while operable do not perform as well as desired. These types of valve are susceptible to contamination and do not perform well when a low pressure drop is required.

Within automated or "commanded" valves, the gate is typically actuated by a solenoid and opened or closed in response to an electrical current applied to the solenoid coil. These solenoid-powered gate valves also tend to include a coil spring, diaphragm, or other biasing element which biases the gate towards an unpowered, 'normally open' or 'normally closed' position. Since the biasing force must overcome frictional forces resisting movement of the gate in order to return it to its normal position, and since the solenoid mechanism must overcome both these same fictional forces and any biasing force in order to move the gate to an actively-powered position, frictional forces tend to dictate much of the required solenoid operating force.

A good seal, between the inlet and outlets when the gate is closed, typically requires some degree of interference between the gate and the walls of the conduit. Increasing the design's interference to obtain a reliable, high quality seal (especially when accounting for component variation within reasonable tolerances) tends to increase both the frictional forces resisting movement of the gate and the required solenoid operating force. However, if seal reliability and quality could be maintained with lower frictional resistance, reductions in solenoid operating force would beneficially allow for a reduction in the size, weight, and heat-dissipation requirement of the solenoid mechanism, and thus for a reduction in the size, weight, and power demand of the gate valve as a whole. Such an improved gate valve is needed.

SUMMARY

Disclosed herein is a solenoid-powered gate valve that provides reliable, high quality seal with a reduced operating force requirement. In one aspect, the solenoid-powered gate valve is included in the fluid engine coolant pathway between the engine cooling system and a heating element that is in thermal communication with DEF held in a reservoir, to control the flow of engine coolant and therefor eliminate freezing of the DEF. The valve includes a solenoid coil and armature connected to a valve mechanism, with the valve mechanism including a conduit defining a pocket for the sprung gate assembly, which is linearly movable within the pocket between a flow (open) position and a no-flow (closed) position. The sprung gate assembly includes a first gate member, a second gate member opposing the first gate member, and an endless elastic band retained between the first and second gate members, with the first and second gate members being mechanically coupled to the armature for reciprocating linear movement. In some embodiments, the mechanical coupling includes a stem upon which the first and second gate members are each slidable in at least a direction parallel to the longitudinal axis of the conduit, which may be in the same direction or in opposite directions relative to one another.

The endless elastic band permits the sprung gate assembly to produce an interference fit within the pocket without the large frictional forces that would be generated by compressing an integral gate constructed from a single, more rigid material, and reduces the need for narrow component tolerances. The slidable mechanical coupling permits the sprung gate assembly to be linearly moved between the open and closed positions by the solenoid mechanism and mechanical coupling which is not precisely aligned with the gate assembly, further reducing potential frictional resistance to movement of the gate assembly. Those of skill will appreciate that the slidable mechanical coupling is a beneficial yet optional part of the invention.

BRIEF DESCRIPTION OF THE DRAWINGS

FIGS. 7-9 are a side perspective view, a bottom view, and a side perspective exploded view, respectively, of one embodiment of a sprung gate assembly.

FIGS. 10-11 are a side perspective view and a side perspective exploded view, respectively, of another embodiment of a sprung gate assembly.

DETAILED DESCRIPTION

Figure 1:
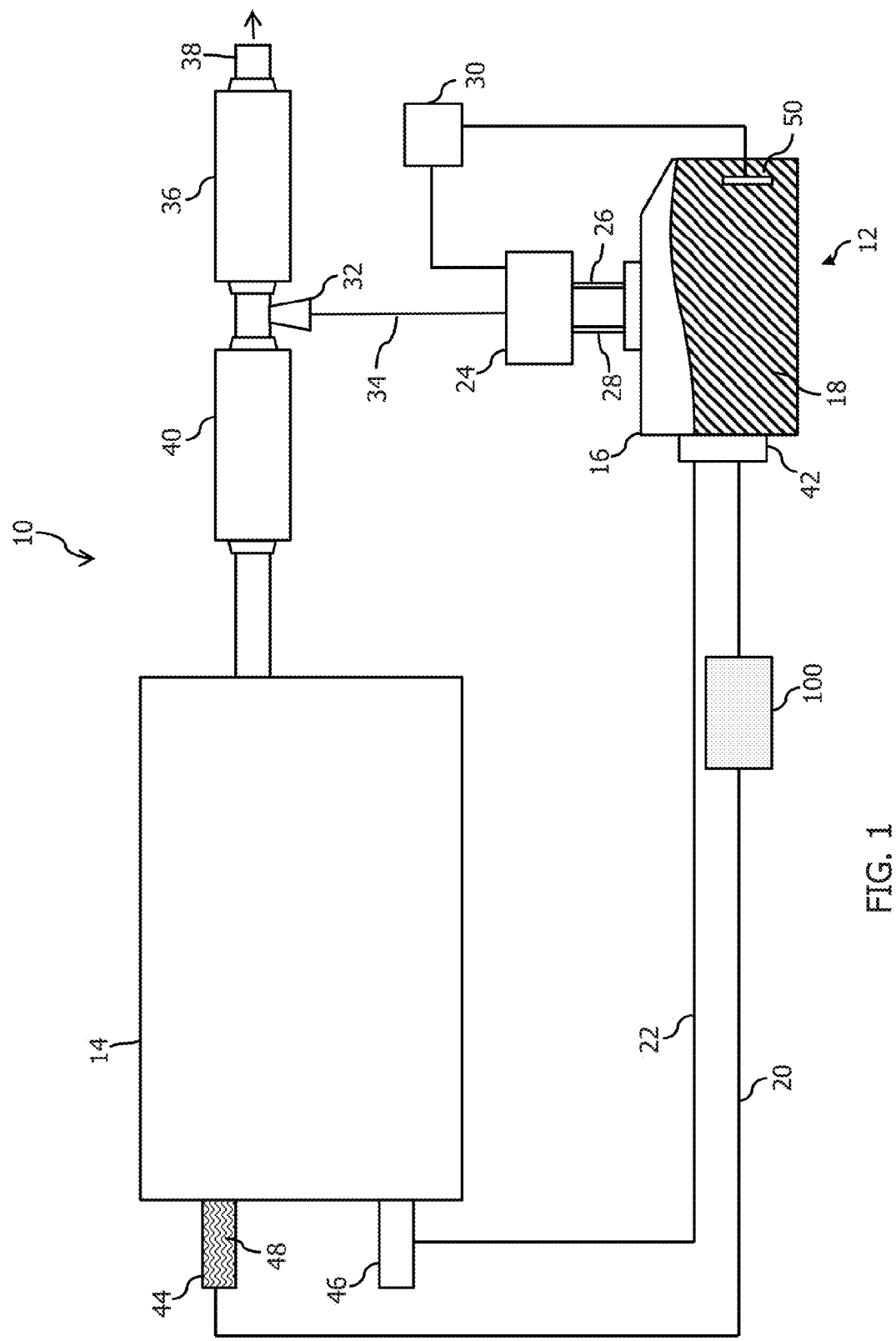
FIG. 1 is a schematic illustration of a diesel engine having a coolant system that includes one of the valves disclosed herein disposed in the engine coolant pathway between a heating element of a reservoir and the diesel engine.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

Figure 2:
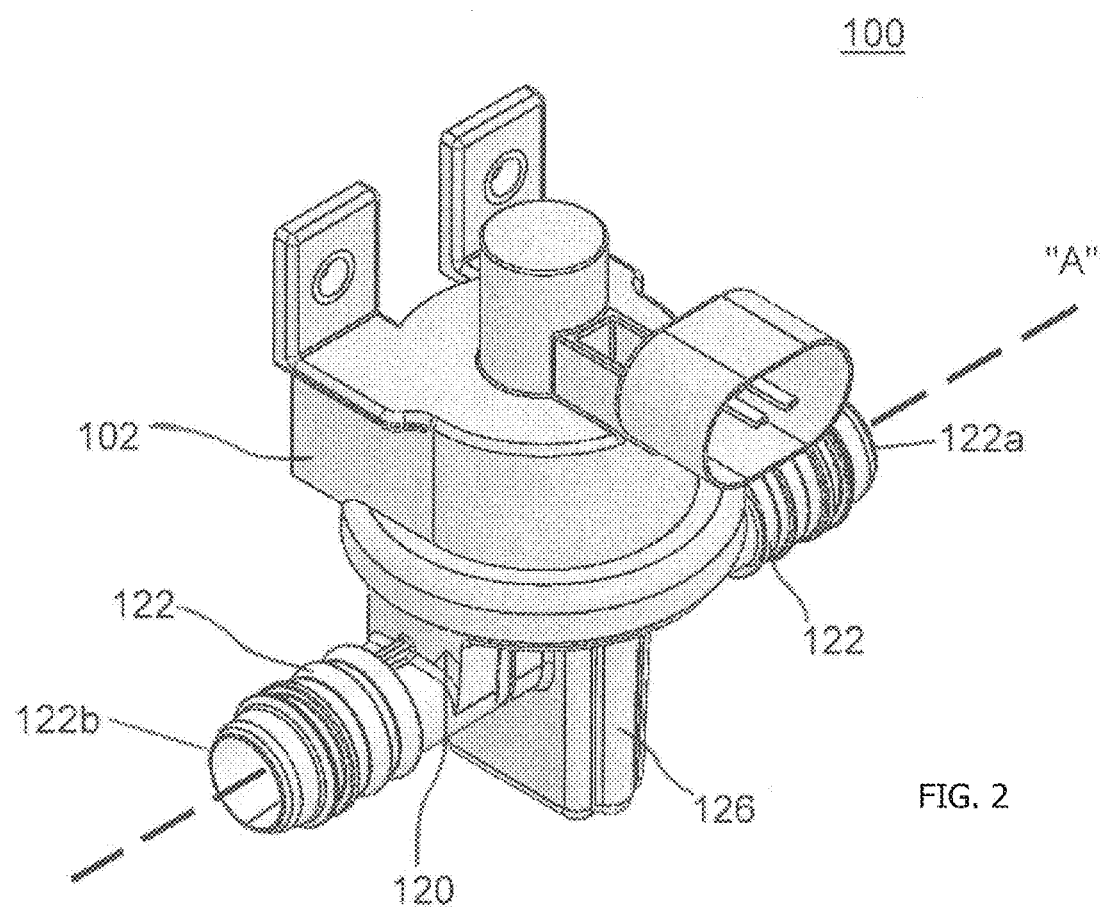
FIG. 2 is a perspective view of a valve including an actuator housing and valve mechanism.
Figure 3:
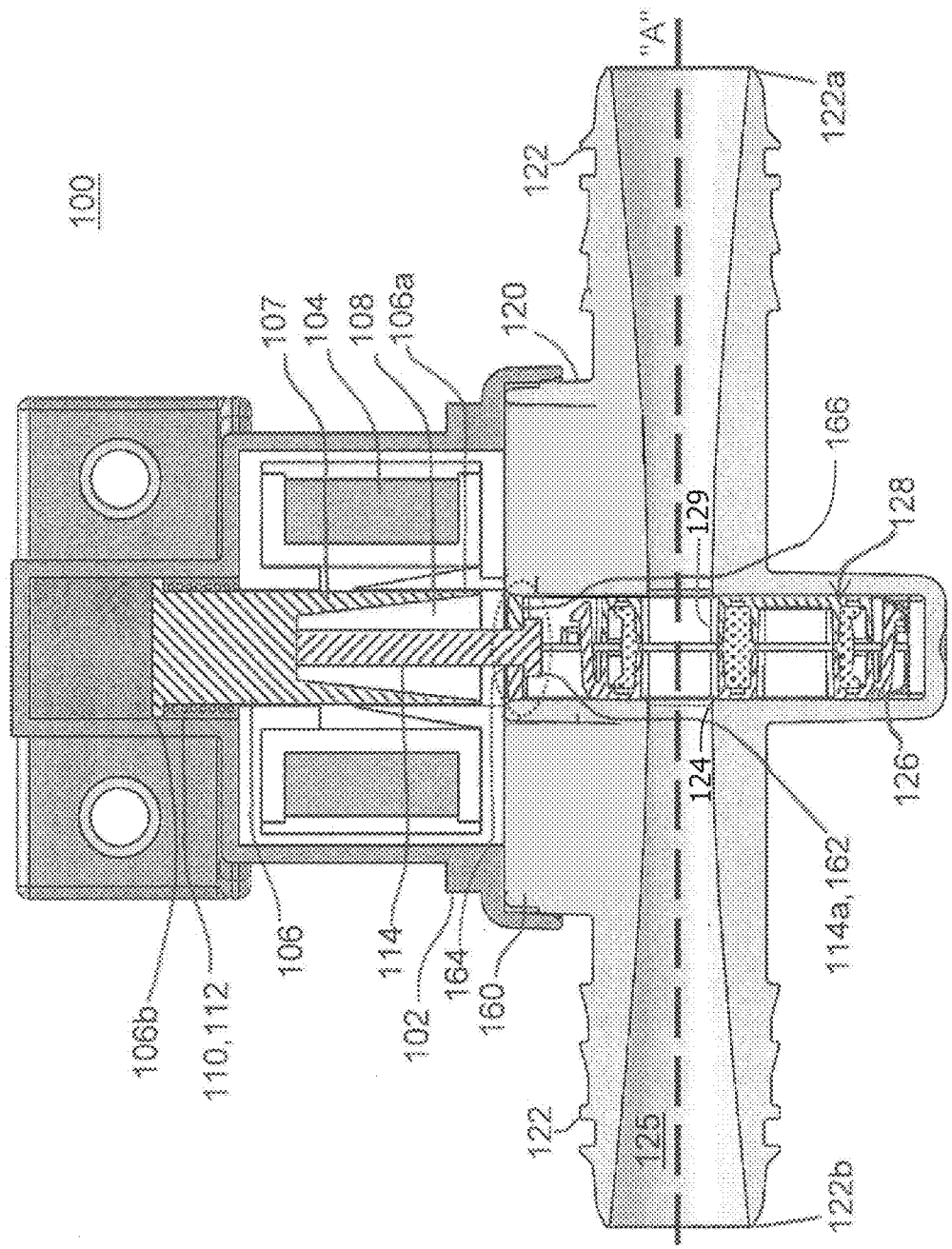
FIG. 3 is a cross-sectional view of the valve of FIG. 1 taken along the longitudinal axis and flow direction of the conduit of the valve mechanism, with a gate in an actively-powered, open position.
Figure 4:
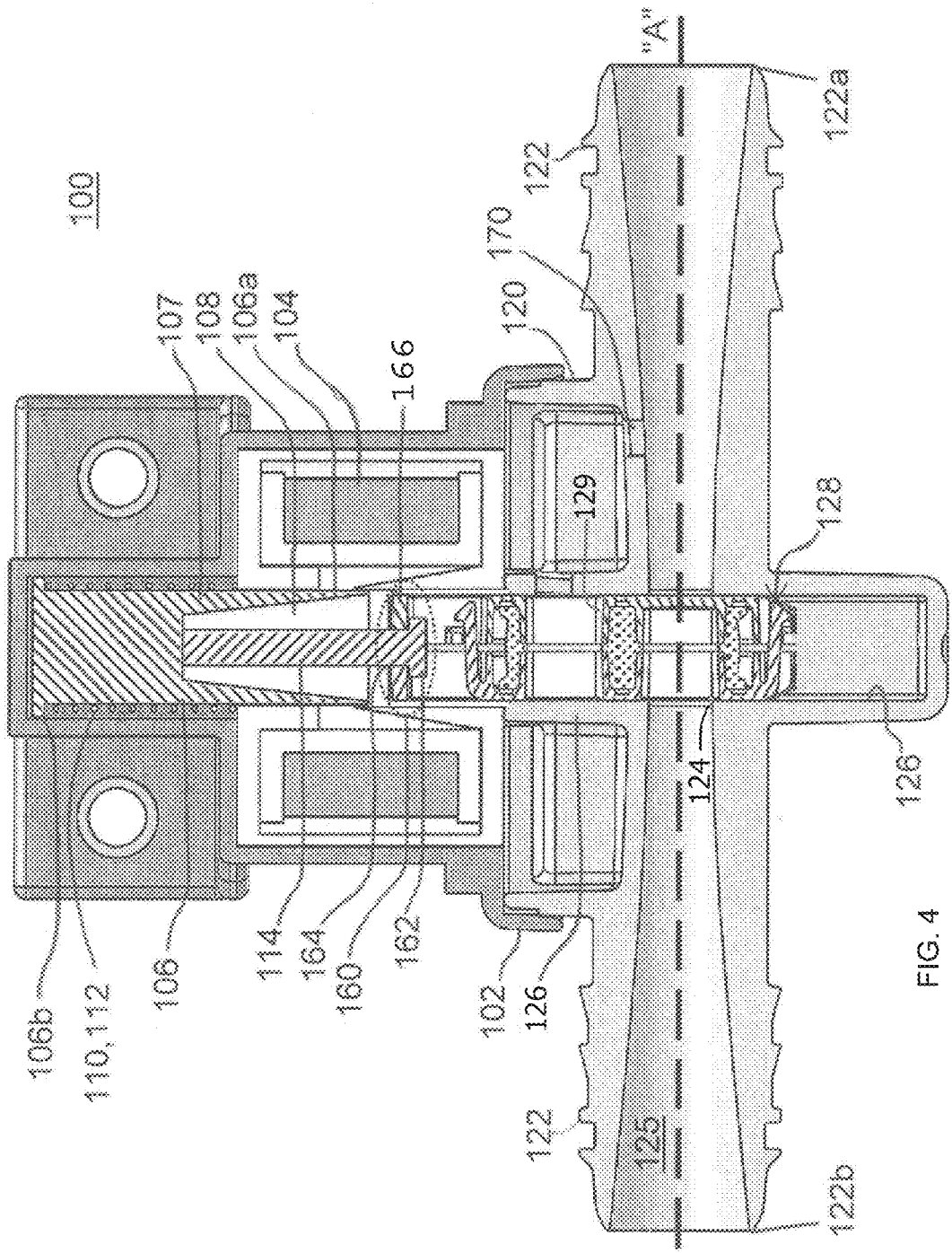
FIG. 4 is a cross-sectional view of the valve of FIGS. 1 and 2, taken along the longitudinal axis of the conduit of the valve mechanism, with the valve in an unpowered, closed position.

FIG. 2 through FIG. 4 each illustrate one embodiment of a gate valve 100 adapted to selectively control the flow of engine coolant 48 flowing between a heating element 42 and a diesel engine 14 as shown in FIG. 1. While FIG. 1 is specific to a diesel engine system, the gate valves disclosed herein may be included in many systems including other systems within any internal combustion engine, but the gate valve 100 provides many advantage in system of FIG. 1, including contamination tolerance. Referring to the schematic illustration in FIG. 1, a diesel engine system 10 is shown that includes a diesel exhaust fluid system 12 having a reservoir 16 containing DEF 18. A heating element 42 is attached to the reservoir 16 so as to place the DEF 18 and the heating element 42 in good thermal communication. High pressure engine coolant flows from fitting 44 through a first conduit 20 that includes a gate valve 100 operatively disposed within the flow pathway defined by the first conduit 20 to control the flow of fluid therethrough. The diesel engine system 10 also include a second conduit 22 defining a second flow pathway between the diesel engine 14 and the heating element 42 attached to the reservoir 16. The reservoir 16 is fluidly coupled to a dosing pump 24 by a DEF suction line 26 and a DEF return line 28, and the dosing pump 24 is operatively coupled to a dosing control module 30 and fluidly coupled to a DEF injector 32 by a DEF pressure line 34. The DEF injector 32 is fluidly coupled upstream of a SCR catalytic converter 36 in the exhaust stream 38 of the diesel engine 14. The diesel engine system 10 may also include a diesel particulate filter 40 in the exhaust stream 38 between the diesel engine 14 and the SCR catalytic converter 36, typically upstream of the DEF injector. Other catalyst components may also be included, such as a lean nox trap, an oxidation catalyst, a hydrogen evolution catalyst, and combinations of these and others.

Still referring to FIG. 1, the gate valve 100 will have two conditions: (1) a no flow condition, and (ii) a flowing condition. The dosing control module 30, or the engine control computer attached to Diesel engine 14 will detect either the ambient temperature, and or the temperature of the DEF 18, by means of temperature sensor 50. When the ambient or DEF 18 temperature is below the freezing temperature of DEF, the gate valve 100 will be commanded to the flowing condition. This will allow engine coolant 48 to flow through the heating element 42. As the engine temperature rises above the freezing temperature of DEF the DEF 18 will melt and become pumpable. After the DEF 18 temperature as measured by temperature sensor 50 has reached a specified temperature the gate valve 100 will be commanded to the no flow condition. In one embodiment, the gate valve 100 has a power off configuration for the no flow condition and a power on configuration for the flowing condition. In another embodiment, the power on and power off may be reversed.

Referring now to FIGS. 2-4, the gate valve 100 may have a housing 102 containing a solenoid coil 104 and an armature 106 operably actuating a valve mechanism 120. The armature 106 includes an insertion end 106a received within the solenoid coil 104 and an adjoining body portion 107 that is more fully received within the solenoid coil 104 upon the application of an electrical current to the coil. In one construction, the insertion end 106a and body portion 107 may be cylinders manufactured from a magnetic or paramagnetic material, for example an iron-containing alloy or a ferrite-containing composite material. Here, the armature 106 and the solenoid coil 104 are shaped and constructed to produce enough force to overcome the bias force and friction force acting on the valve mechanism 120.

In one embodiment, such a shape and construction may include the insertion end 106a and body portion 107 being cylinders having an internal recess 108 tapering from the insertion end 106a in the direction of the body potion 107 in order to provide for a gradual increase in pull-in force. The taper may be configured so that the pull-in force is greater than an oppositely-directed biasing force produced by a biasing element 110. As shown in FIG. 2, the biasing element 110 may be a coil spring 112 surrounding the body portion 107 of the armature 106 and abutting both the solenoid coil 104 and a non-insertion end 106b, but it will be appreciated that the biasing element could be a diaphragm or flat spring abutting or coupled to the non-insertion end 106b, a leaf spring abutting or coupled to the non-insertion end, etc. Those of skill in the art will also appreciate that the solenoid may instead be a bistable solenoid including other biasing elements.

The valve mechanism 120 may include a conduit 122 defining an opening 124 through a pocket 126, also defined by the conduit 122, and a sprung gate assembly 128 having at least one passage 129 therethrough. The sprung gate assembly 128 (FIGS. 2-6) is linearly movable within the pocket 126 to position the sprung gate in a flow condition as shown in FIG. 3 where opening 124 is at least partially aligned with the passage 129 to allow fluid to flow through conduit 122 from the inlet end 122a to the outlet end 122b or vice versa. In one embodiment, the flow condition has the passage 129 of the sprung gate assembly 128 substantially aligned with opening 124. In a closed condition, as shown in FIG. 4, the sprung gate assembly 128 prevents fluid from passing through the opening 124.

As illustrated in FIGS. 3 and 4, the conduit 122 may be a tube that continuously, gradually tapers or narrows along a longitudinal axis "A" from both ends toward the opening 124, thereby having its smallest inner diameter at the opening 124, referred to herein as the cross-section profile 125. This cross-section profile 125 minimizes the pressure drop across the gate valve 100. In other constructions, the conduit 122 may have a uniform inner diameter along its entire length. In the illustrated constructions the cross-section perpendicular to the longitudinal axis "A" is circular, but in variations the cross-section 127 may be elliptical (with uniform or tapering transverse and conjugate diameters), polygonal (with uniform or tapering characteristic widths), etc. While the conduit 122 depicted in the drawings has one inlet and one outlet, this is not to be construed as limiting. In another embodiment, the conduit 122 may have two inlets and one outlet, or two outlets and one inlet, or one inlet, one outlet, and a blind connection.

Figure 5:
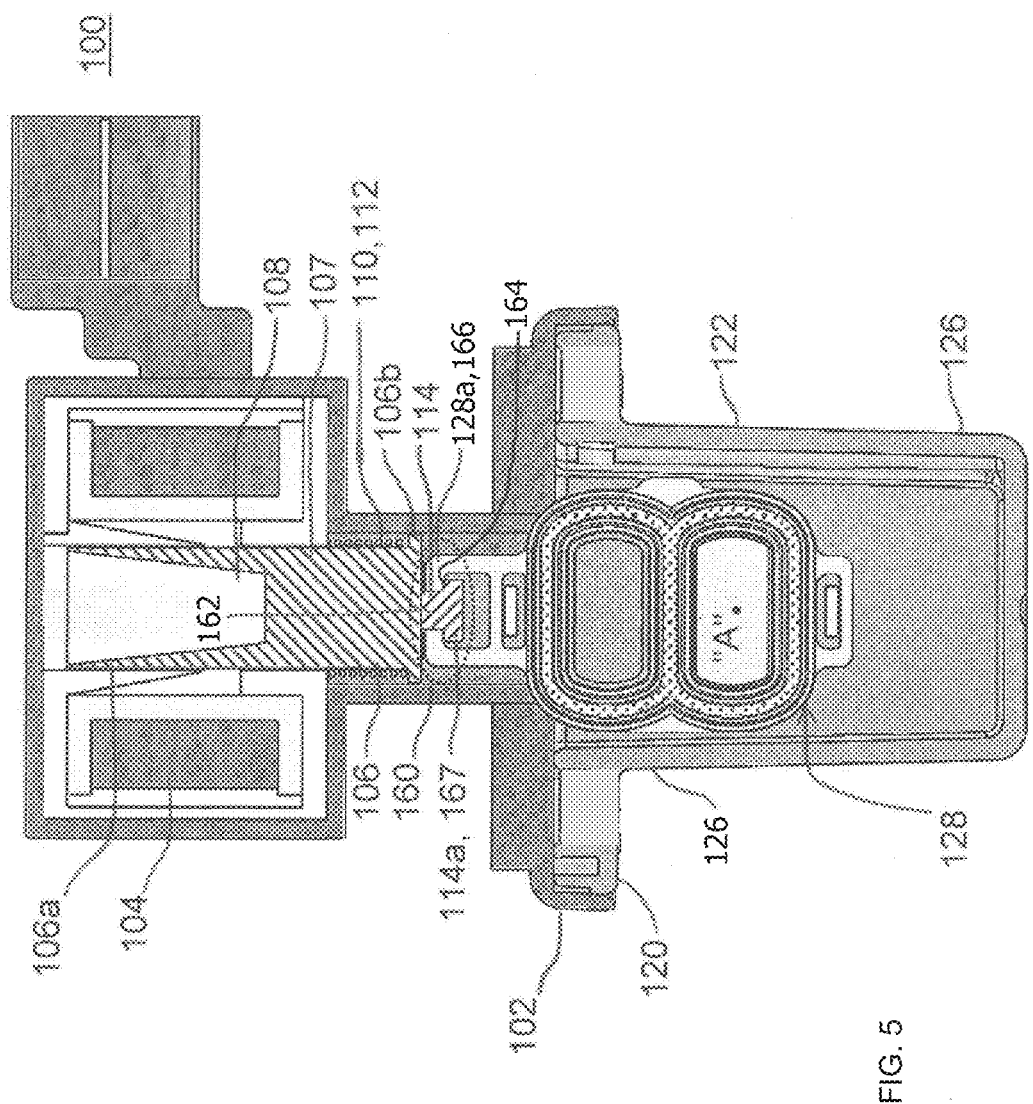
FIG. 5 is a cross-sectional view of a similar embodiment of a valve, taken along a plane perpendicular to the longitudinal axis and flow direction of the conduit of the valve mechanism, with a gate in an actively-powered, closed position.

In the embodiment of FIGS. 2-4, the sprung gate assembly 128 is mechanically coupled to the armature 106 by a stem 114 projecting from within the internal recess 108. In alternate embodiments, a stem 114 may project from the inserted end 106a of the armature 106 or from the non-inserted end of the armature 106, depending on whether the solenoid coil 104 and armature 106 are configured to pull the stem toward or away from the valve mechanism 120 and opening 124. As shown in the embodiment of FIGS. 4 and 5, the relative arrangement of the solenoid coil 104, armature 106, biasing element 110, and stem 114 may be altered to change the gate valve 100 from a normally closed valve to a normally open valve or vice versa (depending upon the detailed construction of the sprung gate assembly 128, as discussed further below). The solenoid may us (1) direct voltage, (2) pulse width modulation (PWM), or (3) peak and hold control to operate the gate valve 100. Peak and hold solenoids (also known as saturated switch solenoids), are useful when faster actuation times, lower average power consumption, lower heat generation, and/or smaller package size are desired. Besides operating the gate valve 100 between a normally closed or normally open position, the gate valve may be operated for proportional control of a plurality of partially open/partially closed positions. In some constructions the stem 114 may be an integral projection from the armature 106, but in other constructions the stem may be an affixed projection manufactured from another, preferably non-magnetic, material. In one embodiment, an electromagnet is included to apply only an attractive force, to pull the armature 106 to a desired position. In order for the armature to move to another position, a spring may be included. Solenoid actuation can also employ permanent magnets to restrain the armature 106 at the end of its travel.

A connection opening end of the stem, 114a, may be affixed to the sprung gate assembly 128, but the mechanical coupling is preferably slidable with respect to the sprung gate assembly in at least a direction parallel to the longitudinal axis of the conduit. In some constructions, the mechanical coupling includes a rail system 160 that permits relative sliding movement between the stem 114 and the sprung gate assembly 128 in a direction parallel to the longitudinal axis A. This slidable mechanical coupling allows the solenoid coil 104 and an armature 106 to operate to linearly move the sprung gate assembly 128 within the pocket 126 without pulling the gate assembly towards either end of the conduit 122. Less than perfect alignment of the solenoid coil 104, armature 106, and/or stem 114 with the valve mechanism 120 would otherwise seek to cant the sprung gate assembly 128 from its path and thus tend to increase the frictional forces between the gate assembly and the walls of the conduit 122.

Figure 6:
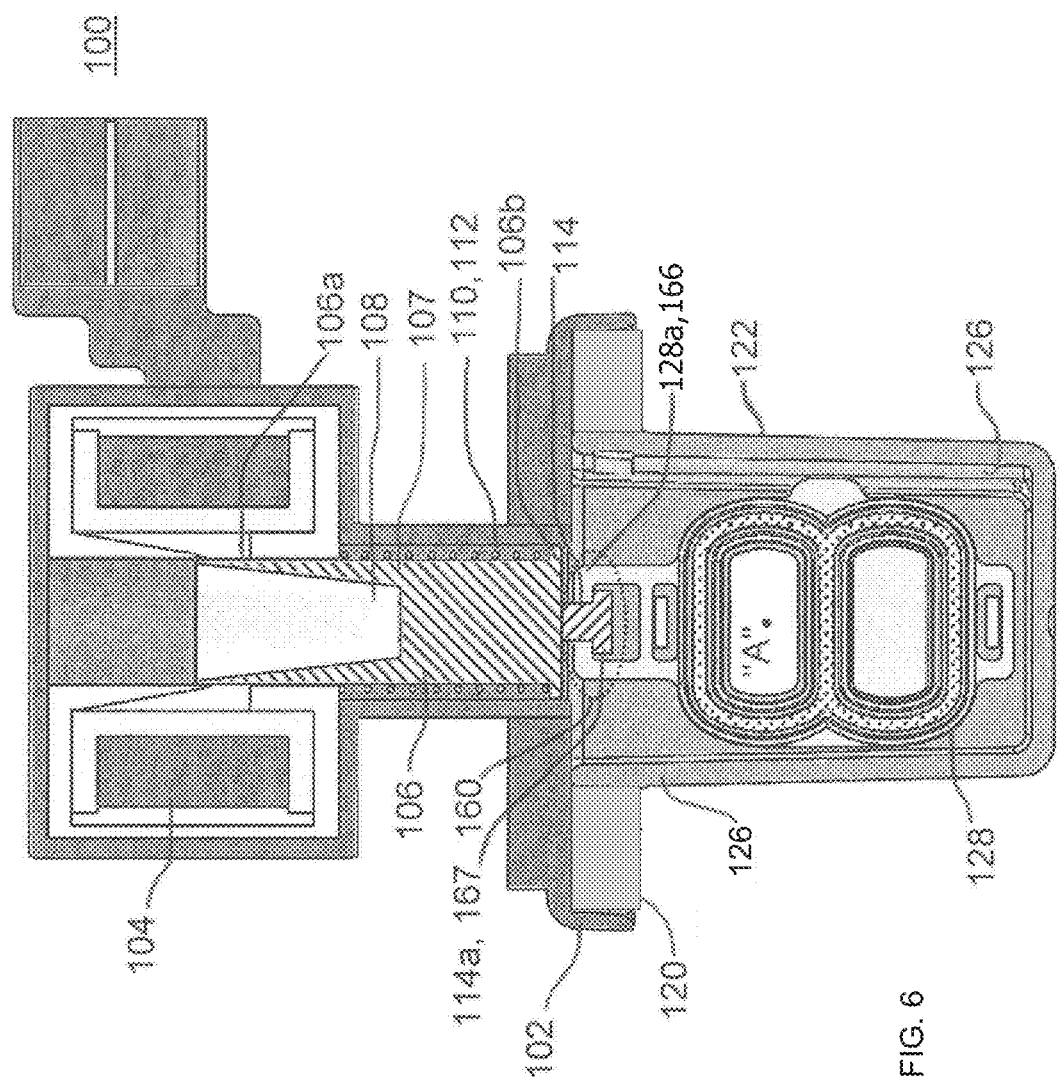
FIG. 6 is a cross-sectional view of the valve of FIG. 4, taken along a plane perpendicular to the longitudinal axis of the conduit of the valve mechanism, with the gate in an unpowered, open position.

The rail system 160 can be better understood by looking to the cross-sections of FIGS. 5 and 6, which are transverse to the longitudinal axis A of the conduit 122. The rail system 160 includes a guide rail 162 positioned near the connection opening end of the stem 114a, with raceway grooves or ledges 164 disposed on opposing sides thereof. The upper end 128a of the sprung gate assembly 128 (the end closer to the solenoid coil 104 and an armature 106) correspondingly includes a slider 166 configured to wrap around the guide rail 162 and project within the raceway grooves 164. In one embodiment, the guide rail 162 may terminate with a plate-like member 167 (FIGS. 5 and 6) that defines a platform or ledges 164 for the slider 166 to rest upon. In a variant construction, the rail system may be reversed, with a slider as part of the stem 114a and the upper end 128a of the sprung gate assembly 128 defining a guide rail and racetrack grooves (not shown).

As seen in FIG. 4 only, the valve mechanism 120 may optionally include a vent port 170 fluidly communicating with the pocket 126 to vent fluids which leak past the sprung gate assembly 128 and into the pocket 126. In FIG. 4, the vent port 170 is in fluid communication with the portion of the pocket 126 disposed between the armature 106 and the opening 124, but is not limited thereto. Vent port 170 may open to the interior of the conduit 122 in order allow fluid to flow from the pocket 126 to an inlet end of the conduit 122a.

Different embodiments of a sprung gate assembly 128, further described below, may be better suited for some applications. In addition, those of skill will appreciate that the gate valve 100 may be used in other applications, including non-automotive applications, and with fluids other than air.

Referring to FIGS. 7-9, a first embodiment of a sprung gate assembly, generally designated as reference number 228, is illustrated. The sprung gate assembly 228 includes a first gate member 230, a second gate member 232, and an endless elastic band 234 received between the first and second gate members 230, 232. The endless elastic band 234 may be described as being sandwiched between the first and second gate members 230, 232. As seen in FIG. 9, the second gate member 232 includes a track 236, for receiving a portion of the endless elastic band, about a portion of its interior surface 252. While not visible in FIGS. 7-9, the first gate member 230 also includes a track 236.

The first and second gate members 230, 232 may be the same or substantially similar members, but are not intrinsically limited in that manner. As illustrated in FIGS. 7 and 9, the first and second gate members 230, 232 may be the same, and thus can be positioned facing either the inlet end 122a or the outlet end 122b of the conduit 122. This produces a valve with similar performance regardless of the direction of fluid flow in the conduit 122.

Referring to FIGS. 7 and 9 specifically, the first and second gate members 230, 232 both have openings 233 therein which collectively define a passage 229. In an open position, such as illustrated in FIG. 3, the passage 229 through the sprung gate assembly 228 is aligned with the conduit 122 to allow fluid to flow therethrough. The portion of the gate having passage 229 is referred to herein as the open position portion 240 (FIG. 7), and the adjacent portion, illustrated opposite the upper end 228a having a slider 266, is referred to as the closed position portion 242 because this portion of the gate 228, when moved to a closed position obstructs the conduit 122 to prevent fluid flow therethrough. The closed position portion 242 of each gate member 230, 232 in this embodiment has a substantially smooth continuous exterior surface 250. Those of skill will appreciate that the open position and closed position portions 240, 242 may be reversed, with the open position portion 240 opposite the connection opening end 228a, providing a second means of changing a gate valve design from normally closed to normally open (or vice versa). While the sprung gate assemblies disclosed herein are depicted as having a closed position portion and an open position portion, other embodiments may have two or more portions creating different degrees of open position portions and at least one closed position portion. In one embodiment, the conduit 122 may have two inlets and one outlet in combination with a sprung gate assembly having at least three different position portions.

In this first embodiment, the endless elastic band 234 is generally oval shaped and thereby includes an inner perimeter 282 defining an open space, an outer perimeter 284, and opposing first and second sides 286, 288. The endless elastic band 234 is received in the tracks 236 of the first and second gate members 230, 232 with the first side 286 received in one track 236 and the second side 288 received in the other track 236. When the endless band 234 is seated in the tracks 236 of the first and second gate members 230, 232 the first and the second gate members 230, 232 are spaced apart from one another by a distance D (FIG. 7). The tracks 236 are positioned to recess the endless elastic band 234 a distance from the outer perimeter of the gate members as well. As seen in FIG. 8, this construction defines a channel 254 around the outer surface of the endless elastic band 234 between the first and second gate members 230, 232. Channel 254 provides for fluid flow around the sprung gate 228 within the pocket 126. If the vent port 170, FIG. 4, is present channel 254 may enable fluid to be displaced within the pocket and to exit via the vent port 170. This venting via channel 254 is generally perpendicular to the direction of fluid flow through the conduit 122 and vents fluid from the pocket as the armature 106 moves the gate more fully into the pocket.

The endless elastic band 234 is compressible between the first and the second gate members 230, 232 and therefore functions as a spring acting parallel to the direction of flow through the conduit 122. Additionally, the endless elastic band 234 is expandable radially outward in response to forces applied to the endless elastic band 234 by fluid flowing through the conduit 122 to form a seal between the endless elastic band 234 and the outer wall portion of the tracks 236 in the first and second gate members 230, 232.

In operation, in the open position as illustrated in FIG. 3, the fluid flowing through the conduit, whether flowing left to right or right to left, passes through passage 229 in the sprung gate assembly 228 and the pressure of the fluid provides a force acting on the endless elastic band 234 directed radially outward thereby pressing the endless elastic band into sealing engagement with the outer perimeter of the tracks 236. This sealing engagement reduces or prevents fluid leakage into the connector opening 124 and pocket 126, which renders the sprung gate assembly 228 more leak resistant than a single-material, uniformly rigid gate.

The endless elastic band 234 also produces a gate that is less sensitive to manufacturing tolerances, in particular with respect to the dimensions of pocket 126 and the thickness of the gate members 230, 232, because of the presence of the endless elastic band. The pocket 126 is typically formed to have a width that is smaller than the unloaded width of a sprung gate assembly 228 so as to produce an interference fit. In the sprung gate assembly 228, the endless elastic band 234 becomes compressed between the first and second gate members 230, 232 as the sprung gate 228 is inserted into the pocket 126. The endless elastic band's spring force on the first and second gate members 230, 232 when inserted (wedged) into the pocket 126 presses each respective gate member into a sealing engagement with a wall of the pocket to reduce or prevent leaks. Most importantly, the substantially lower modulus of elasticity of the endless elastic band versus that of the rigid gate members 230, 232, or that of a single rigid gate, means that the normal forces acting upon the sprung gate assembly 228 and friction force resisting linear movement of the assembly along its path are substantially less. This reduces the frictional forces (frictional force is equal to normal force times the coefficient of friction) and thus the required solenoid operating force. This benefit is equally applicable to the other embodiments described below.

Referring now to FIGS. 10 and 11, a second embodiment of a sprung gate assembly, generally designated as reference number 228', is provided which similarly includes a first gate member 230', a second gate member 232', and an endless elastic band 235' received between the first and second gate members 230', 232'. The endless elastic band 235' may be described as being sandwiched between the first and second gate members 230', 232'. As seen in FIG. 11, the second gate member 232' includes a track 237' about a portion of its interior surface 252' for receiving a portion of the endless elastic band 235'. While not visible in FIGS. 10 and 11, the first gate member 230' also includes a track 237'. Both gate members 230', 232' have a upper end 228a having a slider 266' for slidably coupling the gate assembly 228' to armature 106 as described above. However, as discussed above, in all such embodiments the members 230, 230', 232, 232', etc. may alternately include a guide rail and racetrack grooves similar to the guide rail 162 and racetrack grooves 164 of the stem 114.

Here, as illustrated in FIG. 11, the endless elastic band 235' is generally a figure-eight shaped band of elastic material and thereby includes a first inner perimeter 272 defining a first open space, a second inner perimeter 273 defining a second open space, an outer perimeter 274, and opposing first and second sides 276, 278. The endless elastic band 235' is received in the tracks 237' of the first and second gate members 230', 232' with the first side 276 received in one track 237' and the second side 278 received in the other track 237'. Since the endless elastic band 235' is figure-eight shaped, the track 237' is also typically figure-eight shaped. When the endless elastic band 235' is seated in the tracks 237' of the first and second gate members 230', 232', the first and the second gate members 230', 232' are spaced apart from one another by a distance D' (FIG. 10). The tracks 237 are positioned to recess the endless elastic band 235' a distance from the outer perimeter of the first and second gate members 230', 232' to provide venting as described above with respect to FIGS. 7-9.

The first and second gate members 230', 232' are structurally different from one another, but both have first openings 233' therein which collectively defines a passage 229' which, in an open position, is aligned with the conduit 122 to allow fluid to flow therethrough. This portion of the gate is referred to as the open position portion 240' (FIG. 10), and an adjacent portion thereto, opposite the slider 266', is referred to as the closed position portion 242' because this portion of the spring gate assembly 228', when moved to a closed position, obstructs the conduit 122 to prevent fluid flow therethrough. In this embodiment, the closed position portion 242' of the first gate member 230' includes a second opening 244' therethrough. The second opening may be dimensioned substantially the same as the first opening 233'. The second gate member 232' does not include a second opening in the closed position portion 242' thereof. Instead, the closed portion 242' of the second gate member 232' has a substantially continuous smooth exterior surface. The second gate member 232' may optionally include a plug 253' projecting from its interior surface 252', configured to fit within the dimensions of the second open space defined by the endless elastic band 235', and dimensioned to be at least the size of the second opening 244' in the first gate member 230', which defines a smaller opening than the second inner perimeter 273 of the endless elastic band 235'. The plug 253' may be a substantially smooth portion of the interior surface 252' of the second gate member 232'.

In the open position, fluid flowing through passage 229' provides a force acting on the endless elastic band 235' directed radially outward thereby pressing the endless elastic band into sealing engagement with the outer perimeter of the tracks 237'. This sealing engagement reduces or prevents fluid leakage into the into the pocket 126, which renders the gate 228' in the embodiment of FIGS. 10 and 11 more leak resistant than a single-material, uniformly rigid gate.

In the closed position, fluid flow in the conduit 122 may be in the direction toward the side of the sprung gate 228' defined by the first gate member 230', i.e., the first gate member 230' may face an inlet end 122a of the gate valve 100. In particular, this orientation of flow is beneficial when the conduit 122 is connected the high pressure engine coolant from fitting 44. This is so because the coolant pressure passes through the second opening 244 and is directed by the plug 253' toward the second inner perimeter 273 of the endless elastic band 235' to act radially outwardly on the endless elastic band to sealingly engage it against the tracks 237' of the first and second gate members 230', 232'. The presence of the second opening 244' also minimizes the surface area of the exterior surface of the first gate member 230' upon which the coolant pressure can apply a force acting parallel to the flow direction within the conduit 122 to axially compress the endless elastic band 235'. If the coolant pressure does compress the endless elastic band 235' in the axial direction, one of the gate members 230', 232' would move closer to the other, decreasing D', and creating a gap between one wall of the pocket 126 and that gate member through which fluid could leak. This is an undesirable result. Accordingly, for gate member 228', it would be undesirable for the coolant pressure to flow into the conduit in a direction that would impact the second gate member's 232' substantially continuous smooth exterior surface.

Figure 12:
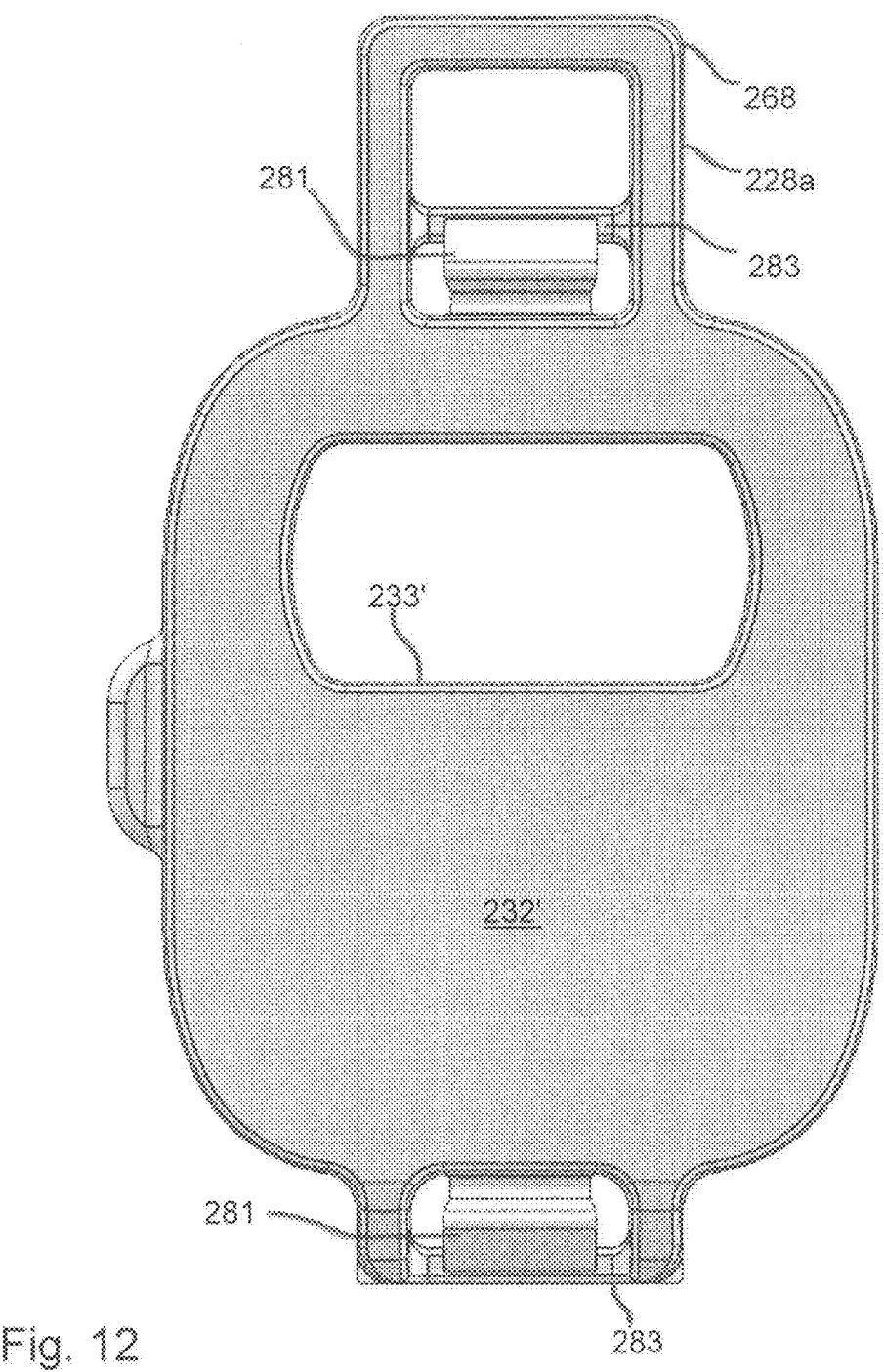
FIGS. 12-14 are a front view of a variant sprung gate member, a side cross-section of a variant sprung gate assembly, and a top perspective view of the variant sprung gate assembly. A pair of latches 281 are shown in FIG. 12 for context.
Figure 13:
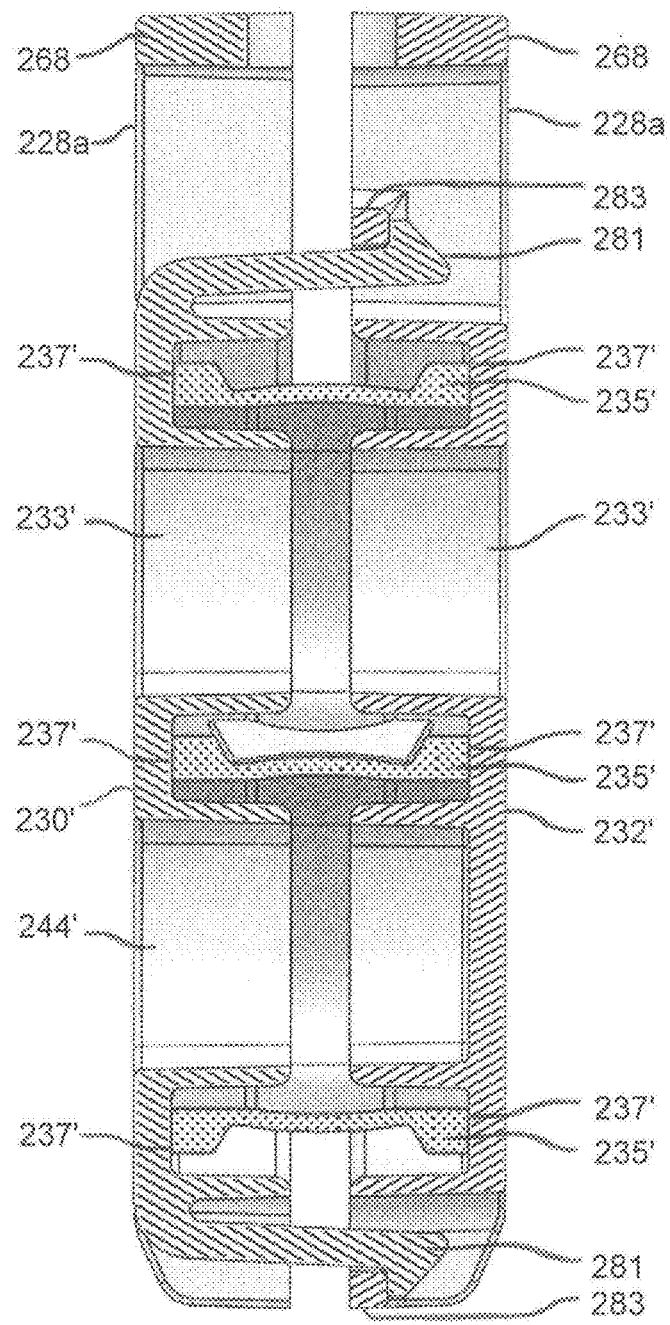
Figure 14:
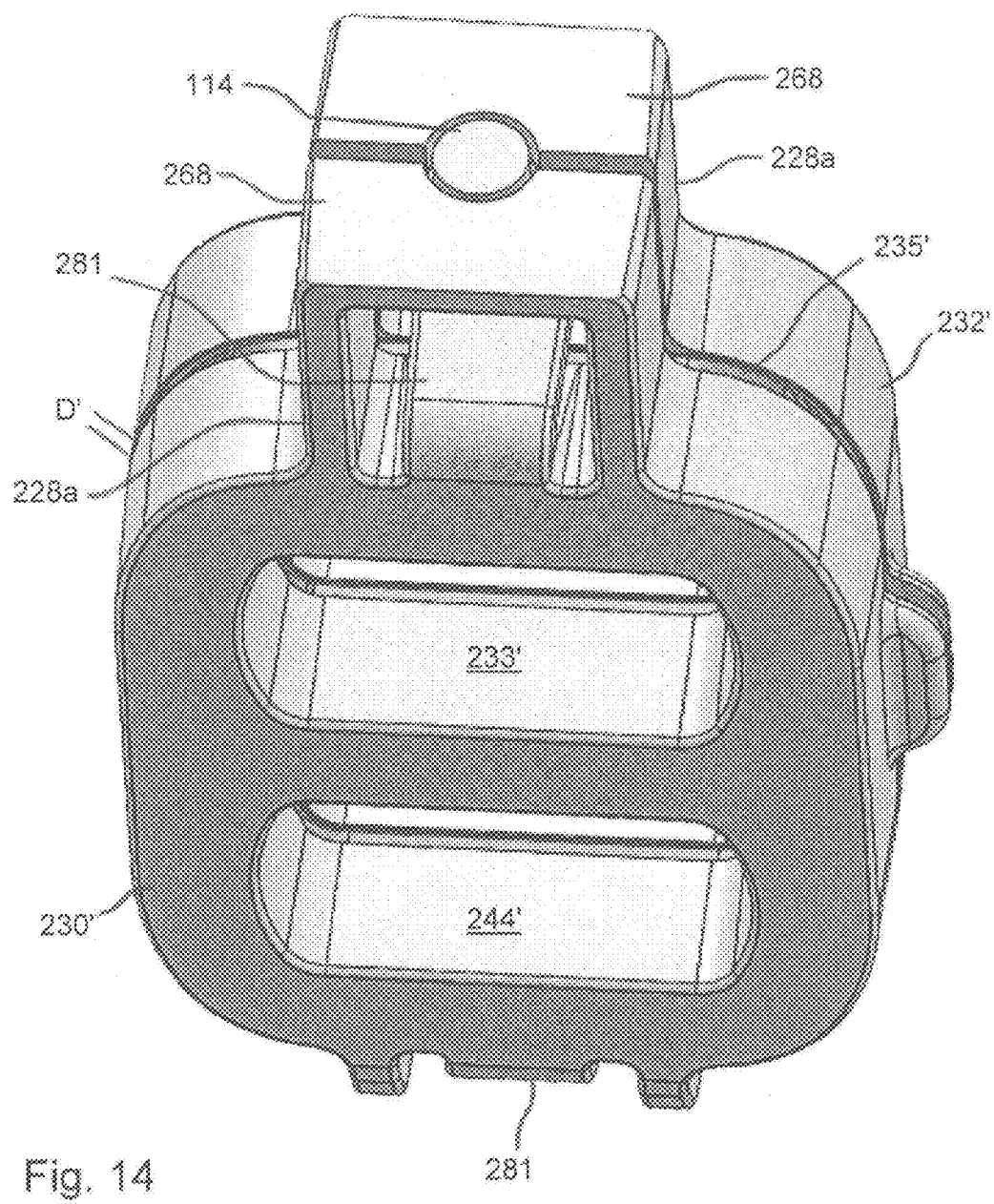

Referring now to FIGS. 12-14, in a variant of this or other embodiments one of the gate members 230', 232' of FIGS. 10 and 11. Here, the sprung gate assembly 228' includes a latch 281 and the other of the gate members 230', 232' may include a correspondingly disposed detent 283. As illustrated, the one may include a plurality of latches 281 and the other may include a plurality of detents, or each may include one latch 281 and one detent 283, with the latch 281 and detent 283 disposed on opposite ends of the member 230', 232' to correspond to the disposition of its counterpart element. The latches 281 and detents assist in the assembly of the sprung gate assembly 228' (or 128, 228, etc.) by actively retaining the assembly in an assembled configuration prior to insertion within the pocket 126. Also, in a variant of this or other embodiments the gate members 230', 232' may collectively define a multi-part socket 268 which snaps around the head 167 of the stem 114 shown in FIGS. 5 and 6. The multi-part socket 268 assists in the assembly of the sprung gate assembly 228' (or 128, 228, etc.) by actively retaining the assembly upon the stem 114 prior to insertion within the pocket 126. The multi-part socket 268 may snap using a snap fit feature around the head 167 of the stem 117 to permit sliding movement in multiple directions perpendicular to the path of linear movement of the sliding gate assembly 228'.

Figure 15:
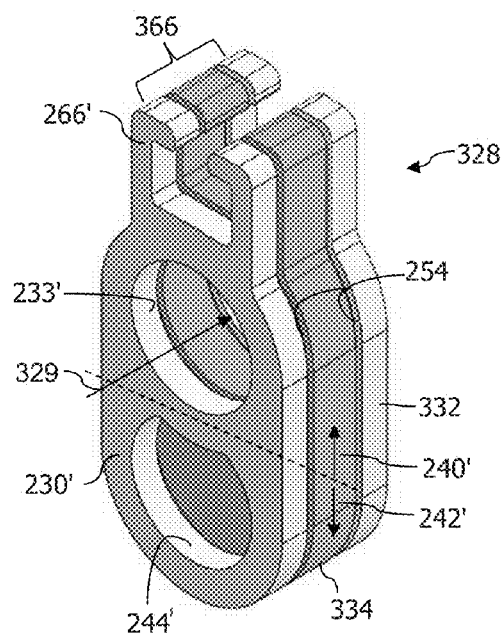
FIGS. 15-17 are a side perspective view, a front view, and a longitudinal cross-section of yet another embodiment of a sprung gate assembly.
Figure 16:
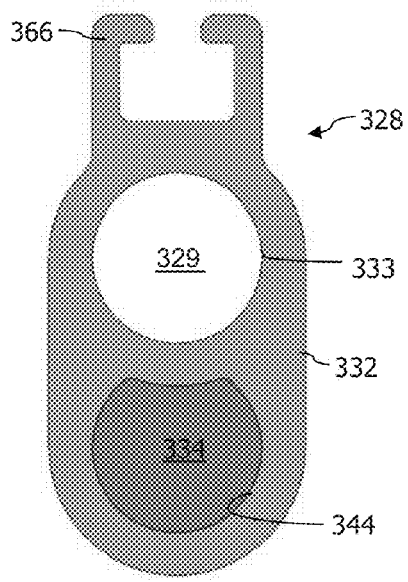
Figure 17:
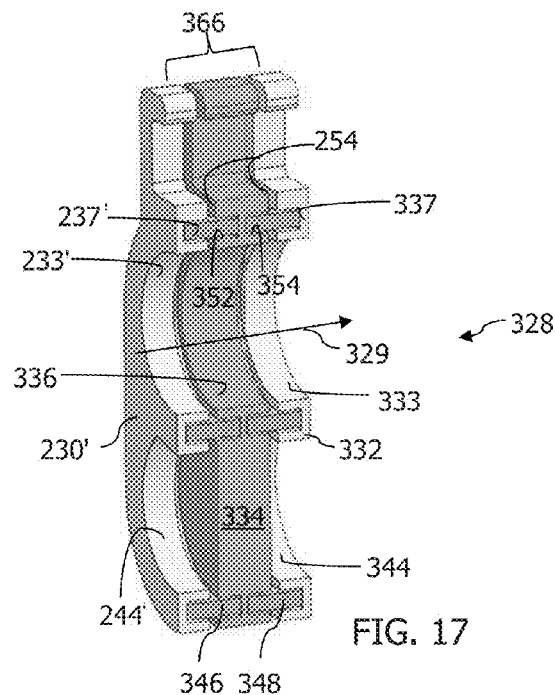

Referring now to FIGS. 15-17, a universal sprung gate assembly (operable with flow directed toward either of the first or the second gate members) is illustrated and designated by reference numeral 328. The universal sprung gate 328 has same first gate member 230' as the embodiment in FIGS. 10 and 11, a second gate member 332 that has the same general construction as the first gate member 230', an inner gate member 334 that provides the obstruction necessary for the closed position, a first endless elastic band 346 disposed within a track defined between the first gate member 230' and the inner gate member 334, and a second endless elastic band 348 disposed within a track defined between the second gate member 332 and the inner gate member 334. The second gate member 332, see FIG. 16, may include a slider 366, a first opening 333 in the open position portion 240', and a second opening 344 in the closed position portion 242' thereof. The inner gate member 334 includes an opening 336 in an open position portion 240' thereof and has opposing substantially continuous exterior surfaces defining the closed position portion 242', which can obstruct the flow of fluid through the conduit when the universal sprung gate 328 is in the closed position.

In the embodiment of FIGS. 15-17, the figure-eight shaped endless elastic band is preferred because of the two openings in each of the first and second gate members 230', 332. The figure-eight shaped endless elastic bands 346, 348 are as described above. Here, the first endless elastic band 346 is seated both in a first track 352 in the inner gate member 334 and in a track 237' in the first gate member 230', which are preferably in the shape of a figure-eight dimensioned to receive the first endless elastic band 346. Similarly, the second endless elastic band 348 is seated both in a second track 354 in the inner gate member 334 and in a track 337 in the second gate member 332, which are preferably in the shape of a figure-eight dimensioned to receive the second endless elastic band 348.

In operation, the universal sprung gate 328, in the open position and in the closed position, operates as described above with respect to the first gate member side of the sprung gate 228' of FIGS. 10 and 11. Its universal nature and the benefit of the reduced surface area in the closed position portion of each of the first and second gate members makes this gate function to seal the gate to reduce or prevent leakage into the connector opening 124 and pocket 126 regardless of the direction of flow through the conduit. This embodiment also has the benefit of providing multiple channels 254 around the exterior of the endless elastic band to provide fluid communication between the actuator and the vent port 170.

In one aspect, disclosed herein is a solenoid-powered gate valve. The solenoid actuates a sprung gate assembly comprising an endless elastic band retained between a first gate member and a second gate member which collectively together define a passage through the gate assembly in an open position, and in which and a pocket within a conduit having the gate movable therein between an open position, where the passage through the gate is aligned with the conduit, and a closed position where a second portion of the gate obstructs the conduit to prevent fluid flow therethrough.

In one embodiment, the endless elastic band is generally an oval band of elastic material. In another embodiment, the endless elastic band is generally shaped as a figure-eight band of elastic material. In one embodiment, the elastic material is a natural or synthetic rubber. An elastic material enhances the seal of the sprung gate assembly without adding excessive frictional hysteresis to the actuator, which is undesirable because it is difficult to control with respect to at least time and temperature.

In one embodiment, at least one of the first and second gate members has a substantially smooth exterior surface, in particular on the closed position portion of the gate. In another embodiment, where only one of the first and second gate members has a substantially smooth exterior surface, the other gate member includes a second opening in the closed position portion of the gate. In another embodiment, both the first and second gate members include a second opening in their respective closed position portions; thus, to provide a closed portion the gate also includes an inner gate member having a substantially continuous exterior surface on both faces of the closed position portion thereof and a second endless elastic band as a seal between the inner gate member and the second gate member.

The benefits and advantages provided by the use of the sprung gate assembly with the solenoid actuator include more tolerance in manufacturing and assembly of the sprung gate within the pocket and reduced leak around the gate by utilizing the pressure of the fluid flowing therethrough (as it acts upon the gate members). The results of these benefits is a solenoid that has a smaller physical size requiring less power to move the sprung gate assembly. This is advantageous in automotive and off high-way vehicles as the solenoid and sprung gate assembly successfully operate within the electrical and physical size parameters of such engines.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader, and are not for the purpose of limiting the invention.

What is claimed is:

1. A diesel engine fluid reservoir system comprising:
 a reservoir of diesel exhaust fluid in thermal communication with a heating element;
 a conduit loop for the flow of engine coolant fluid to the heating element and back to a diesel engine having a sprung gate valve with a no-flow position and a flow position for control of the engine coolant fluid flow therethrough;
 a temperature sensor disposed to sense ambient temperature and/or a temperature of the diesel exhaust fluid;
 a controller communicatively coupled to the temperature sensor and communicatively coupled to the sprung gate valve;
 wherein when the temperature sensor senses a temperature below the freezing point temperature of the diesel exhaust fluid, the controller sends a signal to the sprung gate valve to be in the flow position;
 wherein the sprung gate valve comprises:
  an endless elastic band sandwiched between a first gate member and a second gate member that each define an opening therethrough alignable with the conduit loop in the flow position thereby allowing engine coolant fluid to flow to the heating element to transfer heat to the diesel exhaust fluid; and
  a solenoid actuator that moves the first and second gate members together linearly within a pocket within the conduit loop.

2. The diesel engine fluid reservoir system of claim 1, wherein when the temperature sensor senses a temperature indicating that the diesel exhaust fluid has reached a specified temperature, the controller sends a signal to the sprung gate valve to be in the no-flow position.

3. The diesel engine fluid reservoir system of claim 1, wherein the first gate member includes a first fastener at a trailing end thereof and a second fastener at a leading end thereof, and the second gate member includes a first fastener receiving member positioned for alignment with the first fastener and a second fastener receiving member positioned for alignment with the second fastener.

4. The diesel engine fluid reservoir system of claim 1, wherein the endless elastic band spaces the first gate member a distance apart from the second gate member.

5. The diesel engine fluid reservoir system of claim 1, wherein the endless elastic band is generally oval-shaped or is generally figure 8-shaped.

6. The diesel engine fluid reservoir system of claim 1, wherein the first and second gate members each include a track in which the endless elastic band is seated.

7. The diesel engine fluid reservoir system of claim 1, wherein the first gate member defines a second opening therethrough in a closed position portion thereof, and the second gate member, in a closed position portion thereof, includes a plug projecting from its inner surface toward the second opening in the first gate member.

8. The diesel engine fluid reservoir system of claim 1, wherein the sprung gate valve has a power off configuration for the no-flow position.

9. The diesel engine fluid reservoir system of claim 1, wherein the selenoid has peak and hold control to operate the sprung gate valve.

10. The diesel engine fluid reservoir system of claim 1, wherein the first gate member includes a fastener connected to a fastener receiving member of the second gate member thereby securing the first and second gate members together.

11. The diesel engine fluid reservoir system of claim 10, wherein the fastener is a latch and the fastener receiving member is a detent in the second gate member.

12. The diesel engine fluid reservoir system of claim 1, wherein the first and second gate members each include a connecting member protruding from a trailing end thereof that together collectively define a multi-part socket, wherein the multi-part socket allows the sprung gate to rotate 360 degrees or more about its central longitudinal axis.

13. The diesel engine fluid reservoir system of claim 12, wherein the multi-part socket includes a generally annular opening most distal the trailing end and a larger chamber more proximate the trailing end relative to the generally annular opening.

14. The diesel engine fluid reservoir system of claim 1, wherein, in the direction of engine coolant flow within the conduit loop, the portion of the conduit loop most proximate the first gate member gradually narrows along the longitudinal axis thereof toward the first gate member.

15. The diesel engine fluid reservoir system of claim 14, wherein the portion of the conduit loop most proximate the second gate member gradually narrows along the longitudinal axis thereof toward the second gate member.

16. The diesel engine fluid reservoir system of claim 15, wherein the portion of the conduit loop most proximate the first gate member and the portion of the conduit loop most proximate the second gate member are defined by the housing of the sprung gate valve.

\* \* \* \* \*